(12) United States Patent
Obara (10) Patent No.: US 7,105,125 B2
(45) Date of Patent: Sep. 12, 2006

(54) DOOR TRIM STRUCTURE FOR AUTOMOBILES

(75) Inventor: Tomoyuki Obara, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 32 days.

(21) Appl. No.: 10/886,579

(22) Filed: Jul. 9, 2004

(65) Prior Publication Data

US 2004/0251712 A1   Dec. 16, 2004

Related U.S. Application Data

(62) Division of application No. 09/786,369, filed as application No. PCT/JP00/04750 on Jul. 14, 2000, now Pat. No. 6,808,224.

(30) Foreign Application Priority Data

Jul. 15, 1999   (JP) ................. 11-201145

(51) Int. Cl.
*B29C 49/04* (2006.01)
(52) U.S. Cl. ....................... 264/540
(58) Field of Classification Search ................. 264/540
See application file for complete search history.

(56) References Cited

U.S. PATENT DOCUMENTS 3,989,275 A   11/1976   Finch et al.

| | | |
|---|---|---|
| 4,306,381 A | 12/1981 | Presto |
| 5,040,335 A | 8/1991 | Grimes |
| 5,595,415 A | 1/1997 | Beaulat |
| 5,700,050 A | 12/1997 | Gonas |
| 5,712,003 A | 1/1998 | Suenaga et al. |
| 5,927,020 A | 7/1999 | Kobrehel |

FOREIGN PATENT DOCUMENTS

| | | |
|---|---|---|
| JP | 56-160826 | 11/1981 |
| JP | 56-161820 | 12/1981 |
| JP | 56-161825 | 12/1981 |
| JP | 59-89211 | 5/1984 |
| JP | 61-144328 | 7/1986 |
| JP | 8-164740 | 6/1996 |
| JP | 11-91454 | 4/1999 |

*Primary Examiner*—Suzanne E. McDowell
(74) *Attorney, Agent, or Firm*—Oblon, Spivak, McClelland, Maier & Neustadt, P.C.

(57) ABSTRACT

Provided is a door trim structure for automobiles, which is made of a thermoplastic resin and of which the inner door panel and the door trim are integrally blow-molded. The inner door panel may have the function of fitting functional members thereto, and may act also as a shock absorber. The inner door panel acting also as a shock absorber may have a plurality of recesses formed on its surface. The door trim structure is lightweight and simple, and is resistant to side-on collision, and its productivity is high. The number of the parts to constitute the door trim structure can be greatly reduced, and the labor and energy necessary for building the structure into a door system can be reduced. The door trim structure is recyclable.

4 Claims, 5 Drawing Sheets

DOOR TRIM STRUCTURE FOR AUTOMOBILES

This application is a divisional of U.S. patent application Ser. No. 09/786,369, filed on Mar. 15, 2001, now U.S. Pat. No. 6,808,224.

TECHNICAL FIELD

The present invention relates to a door trim structure for automobiles that constitutes the inner region around a door window of an automobile. The door trim structure of the invention is simple and has the advantages of good productivity and economical and functional benefit.

BACKGROUND ART

For improving the collision safety of automobiles, the bodies of automobiles are reinforced and air bags are provided in automobiles these days. In the field of automobiles, however, the most important matter is to reduce the fuel consumption for saving resources and for solving environmental problems. To meet it, lightweight automobiles are much desired. For reducing the body weight of automobiles, many their parts are made of resin and not metal, and the conversion from metal to resin for them is remarkable these days. For automobile parts, thermoplastic resins such as polypropylene resins and the like are being much used in place of conventional fiber-reinforced thermosetting resins (FRP), since their moldability is good and their moldings have high mechanical strength and rigidity and since they are recyclable and applicable to various parts.

The requirement for reducing the body weight of automobiles is being severer day by day. For reducing the weight of moldings for automobile parts, much tried are various techniques of reducing the wall thickness of the moldings. However, for reducing the wall thickness of resin moldings, the melt fluidity of the resin melt for the moldings must be increased in addition to the mechanical strength and the rigidity characteristic of the resin moldings. For that object, various techniques have heretofore been proposed of adding other thermoplastic resins or thermoplastic elastomers to polypropylene resins and adding a reinforcing agent such as glass fibers or the like or adding a filler such as talc or the like thereto, to thereby further enhance the mechanical strength and the rigidity of polypropylene resins.

Regarding the improvement in the collision safety of automobiles, the requirement of high-level safety for protecting drivers and passengers from not only conventional head-on collision but also side-on collision is increasing. Of automobiles, doors are the most important constituent members for ensuring the safety of drivers and passengers from side-on collision.

In the door system of automobiles, heretofore, the door trim to form the interior surface-member is made of polypropylene resin or the like in a mode of injection molding of the resin. To reduce the shock in the side-on collision of automobiles, a shock absorbent is disposed between the inner door panel and the door trim. For example, (1) Japanese Patent Laid-Open No. 69780/1993 discloses a trim substrate having a hollow and granular energy absorbent capable of undergoing plastic deformation or brittle fracture inserted thereinto. (2) Japanese Utility Model Registration No. 259345 discloses a door panel for vehicles having a cushionable foam layer formed on the inner surface of its trim. (3) Japanese Patent Laid-Open No. 11829/1997 discloses a technique of inserting an inner member for vehicles (shock eliminator) into the space between an inner door panel and a door trim, in which the shock eliminator is tabular and is provided with lattice ribs on its one surface or both surfaces.

As compared with the structures (1) and (2), the structure (3) is easy to produce and does not require so much labor for its fabrication, and its productivity will be therefore good. For this, however, the shock eliminator with lattice ribs formed thereon must be produced separately in a mode of injection molding, and, in addition, it requires an additional step for inserting it into the space between an inner door panel and a door trim. Therefore, the productivity of (3) is not always so good.

The door trims disclosed are generally produced in a mode of injection molding or injection compression molding, and their trim structures may be integrally molded for good design. However, in the molding method for them, the melt fluidity of thermoplastic resin for them has a great influence on their moldability. Therefore, for reducing their weight and wall thickness, the molecular weight of the usable thermoplastic resin is limited, and, in addition, the characteristics including the impact resistance of the resin could not be utilized with no limitation. A different blow-molding method for producing door trims is known.

For example, (4) Japanese Patent Laid-Open No. 238664/1996 discloses a method for producing at a time two door trims for the left and right sides of a vehicle, which comprises blow-molding a door trim structure integrated with a weather strip-fitting flange, followed by cutting it into two. (5) Japanese Patent Laid-Open No. 89211/1984 discloses a method for producing a blow-molded door trim having air inlet openings and a large number of air outlet holes all for air conditioning through its side surface, for which is used a mold with a number of hole-forming pins aligned on its inner surface.

(6) Japanese Patent Laid-Open No. 164740/1996 discloses a door trim for automobiles that runs over an inner door panel in the waist part of an automobile door to cover it. This is made of a blow-molded structure with partition walls formed in its inner space. In this, a foaming resin material is injected into some hollow spaces, and foamed therein, and the resulting resin foam filled in these spaces acts as a shock absorber. The door panels disclosed are produced in a mode of blow molding, but they all substantially follow the constitution of conventional door trims. Concretely, in these, the inner door panel and the door trim are different members. Optionally combined with a shock absorber disposed therebetween, they are assembled into a door trim structure. To that effect, the door trim structure does not differ at all from conventional ones.

Specifically, the conventional technical idea for fabricating the trim member of the door system for automobiles is merely such that only the interior door trim for automobiles is made of thermoplastic resin so as to reduce its weight, and does not reach an advanced idea of forming the entire door trim structure out of thermoplastic resin. The reason will be because the mechanical strength of thermoplastic resin is not satisfactory and the molding method for the resin is limited, and because the inner door panel must satisfy not only the material function of ensuring the mechanical strength and toughness enough for door panels but also the constitutional function of fitting thereto various functional devices including a door windowpane sliding (automatic) device, a door opening and shutting device, a door locking device, speakers and other members.

The present invention is to provide a door trim structure for automobiles, of which the advantages are that it is lightweight and simple, it is resistant to side-on collision, it can be formed in a mode of integral molding and its productivity is good, the number of elements constituting it is greatly reduced, it does not require much labor and energy for constructing it into doors, and it is recyclable.

DISCLOSURE OF THE INVENTION

In the situation as above, we, the present inventors have assiduously studied how to reduce the weight of automobile doors, how to produce such lightweight doors and how to ensure the side-on collision safety of such lightweight doors, and, as a result, have found that all these problems can be solved by employing a technique of blow molding. On the basis of this finding, we have completed the present invention.

Specifically, the invention is summarized as follows:

1. A door trim structure for automobiles, which is made of a thermoplastic resin and of which the inner door panel and the door trim are integrally blow-molded.

2. The door trim structure for automobiles of above 1, wherein the inner door panel has the function of fitting functional members thereto.

3. The door trim structure for automobiles of above 1 or 2, wherein the inner door panel acts also as a shock absorber.

4. The door trim structure for automobiles of above 3, wherein the inner door panel acting also as a shock absorber is so formed that it has a plurality of recesses on its surface.

5. The door trim structure for automobiles of above 4, wherein the recessed inner door panel is sealed with the door trim.

6. The door trim structure for automobiles of above 1, wherein the thermoplastic resin is selected from polypropylene resins, polyamide resins, polycarbonate resins, polyester resins, and ABS resins.

7. The door trim structure for automobiles of above 1, wherein the thermoplastic resin is a polypropylene resin having a melt index (MI) of from 0.1 to 10 g/10 min.

In these drawings, the numeral references are as follows:
1: Door trim structure for automobiles
2: Inner door panel
3: Door trim
4: Shock absorption site
5: Upper part of shock absorption site
6: Lower part of shock absorption site
7: Door grip fitting site
8: Door knob fitting site
9: Lower sealing site
10: Door windowpane
11: Outer door panel
12: Inner door panel
13: Independent door trim
14: Shock absorbent
21: Blow-molding device
22: Extruder
23: Extrusion die
24: Mold
25: Inner surface of mold
26: Parison pinchcock
27: Blowpipe
28: Parison
29: Protrusion for door knob-fitting site
30: Protrusion for door grip-fitting site
40: Upper protrusion
41: Lower protrusion

BEST MODES OF CARRYING OUT THE INVENTION

The invention is described in detail hereinunder.

The door trim structure for automobiles of the invention is produced by integrally blow-molding a thermoplastic resin, being different from a conventional composite structure composed of an inner door panel of metal and a door trim of thermoplastic resin.

The door trim structure for automobiles of the invention is described with reference to the drawings attached hereto.

Figure 1:
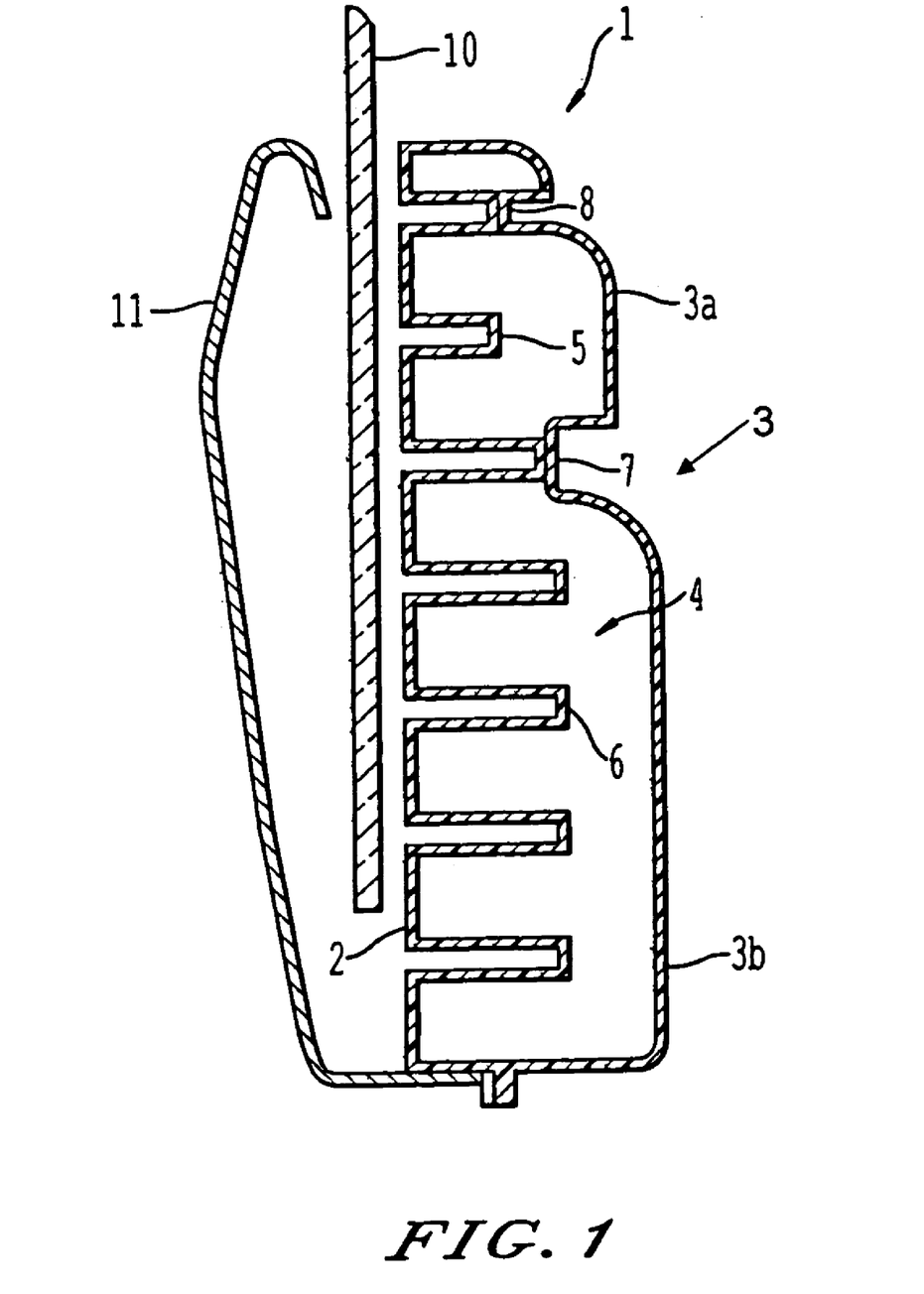
FIG. 1 is a conceptual cross-sectional view of an automobile door into which one embodiment of the door trim structure of the invention is built. For the cross section shown, the structure of FIG. 2 is cut along the X—X line.
Figure 2:
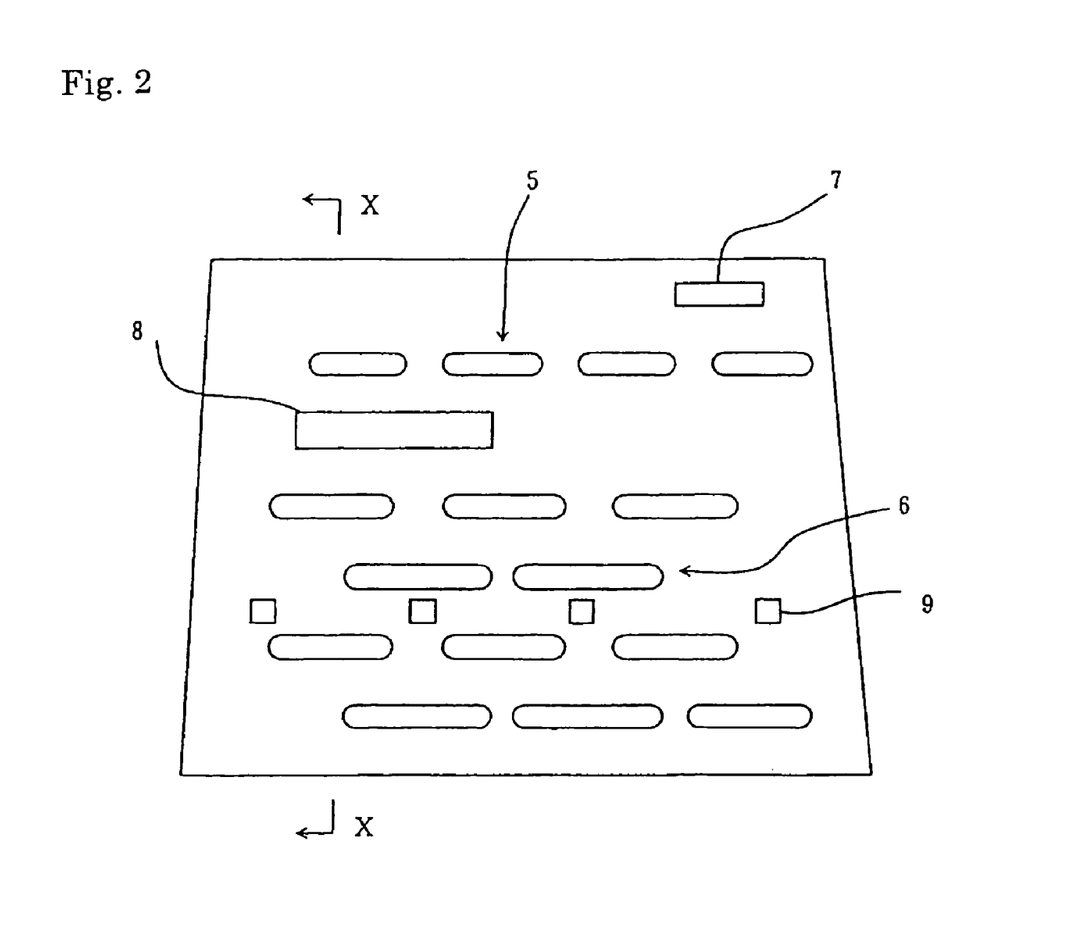
FIG. 2 is a front view of one embodiment of the inner door panel of the door trim structure of FIG. 1.
Figure 3:
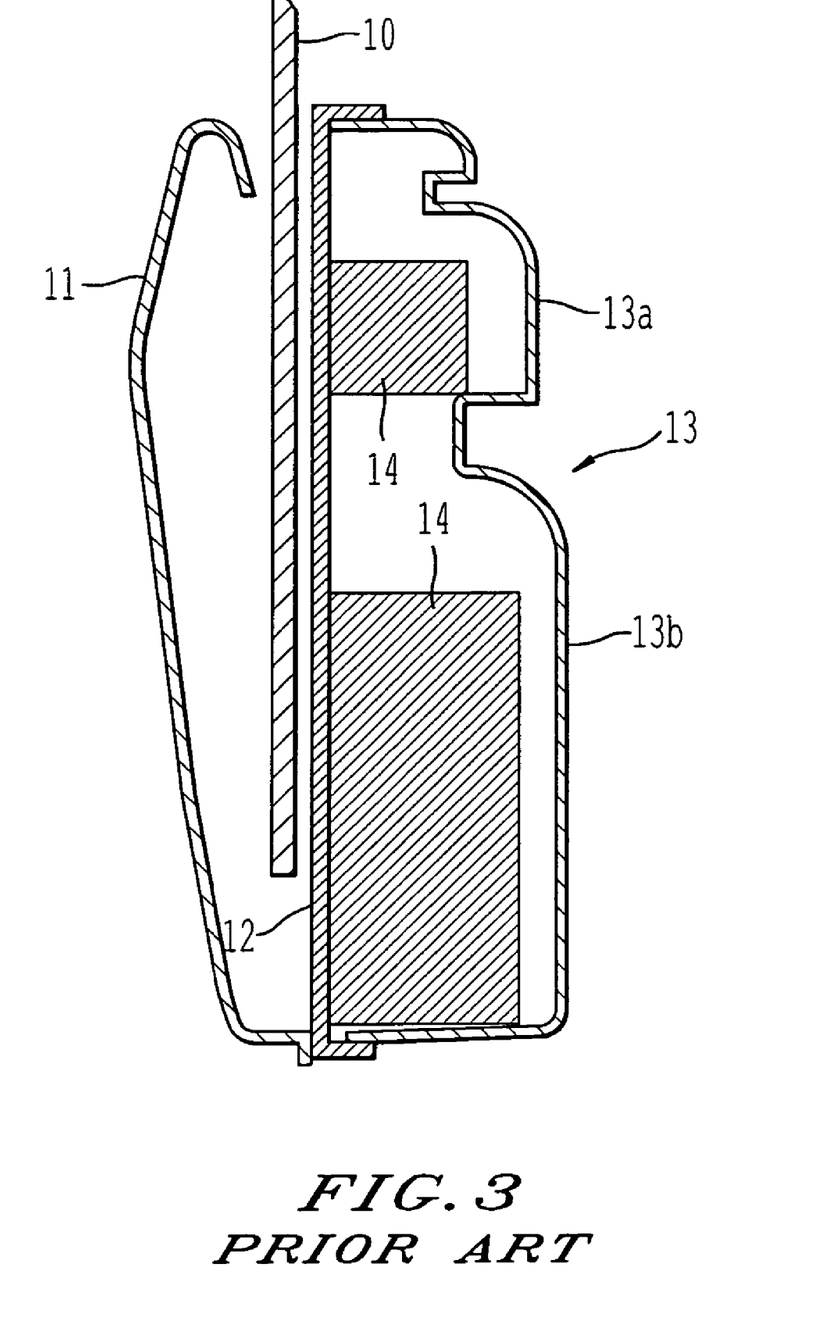
FIG. 3 is a conceptual cross-sectional view of one example of a conventional automobile door system.

FIG. 1 is a conceptual cross-sectional view of an automobile door into which one embodiment of the door trim structure of the invention is built. For the cross section shown, the structure of FIG. 2 is cut along the X—X line. FIG. 2 is a front view of one embodiment of the inner door panel of the door trim structure of FIG. 1. FIG. 3 is a conceptual cross-sectional view of one example of a conventional automobile door system.

In these drawings, 1 indicates a door trim structure for automobiles; 2 indicates an inner door panel; 3 indicates a door trim; 4 indicates a shock absorption site; 5 indicates an upper part of the shock absorption site; 6 indicates a lower part of the shock absorption site; 7 indicates a door grip fitting site; 8 indicates a door knob fitting site; 9 indicates a lower sealing site; 10 indicates a door windowpane; 11 indicates an outer door panel; 12 indicates an inner door panel; 13 indicates an independent door trim; 14 indicates a shock absorbent.

As in FIG. 3, the conventional automobile door system comprises an outer door panel 11 and an independent door trim 13, between which a door windowpane 10 slides up and down. An inner door panel 12 is fitted to the door trim 13 to constitute the door trim structure, in which the door windowpane 10 slides outside the inner door panel 12. Like the outer door panel 11, the inner door panel 12 is made of metal, and this is heavy. Functional members including a device for sliding the door windowpane 10 are fitted to the inner door panel 12.

In the conventional automobile door system, a shock absorbent 14 is disposed between the inner door panel 12 and the upper and lower door trim parts 13a and 13b. The shock absorbent 14 is a resin foam or a shaped article having a plurality of lattice ribs formed thereon, and this is for protecting the door system from side-on collision accidents. In the above-mentioned Japanese Patent Laid-Open No. 164740/1996, proposed is a blow-molded door trim. In this, a foaming resin material is injected into a part of the plurality of hollow spaces, and foamed therein. The resin foam thus filled in the hollow spaces in the door trim acts as a shock absorber, and the door trim is fitted to an inner door panel 12 to cover the upper part of the panel. Also known is a technique of producing door trims in a blow-molding process. However, the door trims are all independent members to be fitted to inner door panels, as so mentioned hereinabove.

Anyhow, the conventional door trim structures for automobiles are all composed of an inner door panel of metal and a door trim of thermoplastic resin, which are optionally combined with a shock absorbent capable of absorbing side-on collision shock. Therefore, reducing the weight of the conventional automobile doors is limited, and, in addition, the door constituent members require complicated production steps, storage and transportation systems, assembly lines and line control. For resource-saving and energy-saving, therefore, desired are better door systems for automobiles.

As in FIG. 1, the door trim structure of the invention is so fitted to the outer door panel that the door windowpane 10 can slide up and down in the space between them, and this differs from that in the conventional automobile door system in that it is produced by integrally blow-molding a thermoplastic resin. The integral blow molding has made it possible to replace the conventional, independent inner door panel of metal with a lightweight, corrosion-resistant resin panel integrated with the trim member.

In addition, in the integral blow molding method, the door trim structure produced in one blow-molding operation can have modified sites into which various functional members for automobile doors can be fitted and, in addition, it can have the function of shock absorption, when the profile of the inner surface of the mold to be used is specifically planned to satisfy the requirements. The blow-molding method is not limited to single-layered structures but may apply to multi-layered structures composed of two or more layers.

FIG. 1 is a conceptual cross-sectional view of the door trim structure 1 for automobiles of the invention, in which the structure is built in a door system for hardtop-type cars with no door window frame. For the cross section shown, the structure of FIG. 2 is cut along the X—X line. The door trim structure 1 of the invention is essentially composed of the inner wall (this corresponds to the inner door panel inside the door windowpane 10) and the outer wall of the door trim 3 (this faces the inside of a car), and it is a blow molding produced by integrally blow-molding a thermoplastic resin.

In the door trim structure shown in FIG. 1 and FIG. 2, the inner door panel and the door trim are formed to have a recessed cross-section profile (for convenience sake, the recesses are designated by the squares in FIG. 2), and their inner surfaces are generally sealed at any desired sites to thereby ensure the necessary mechanical strength and rigidity of the wide-area door trim structure. If desired, the sealed sites may be used, for example, for the door grip-fitting site 7 and for the door knob-fitting site 8, and the lower sealing sites 9 act also to ensure the necessary thickness of the inner wall and the outer wall. Further, these sealed sites contribute to improving the mechanical strength, the rigidity and the twisting resistance of the door trim structure.

Figure 5:
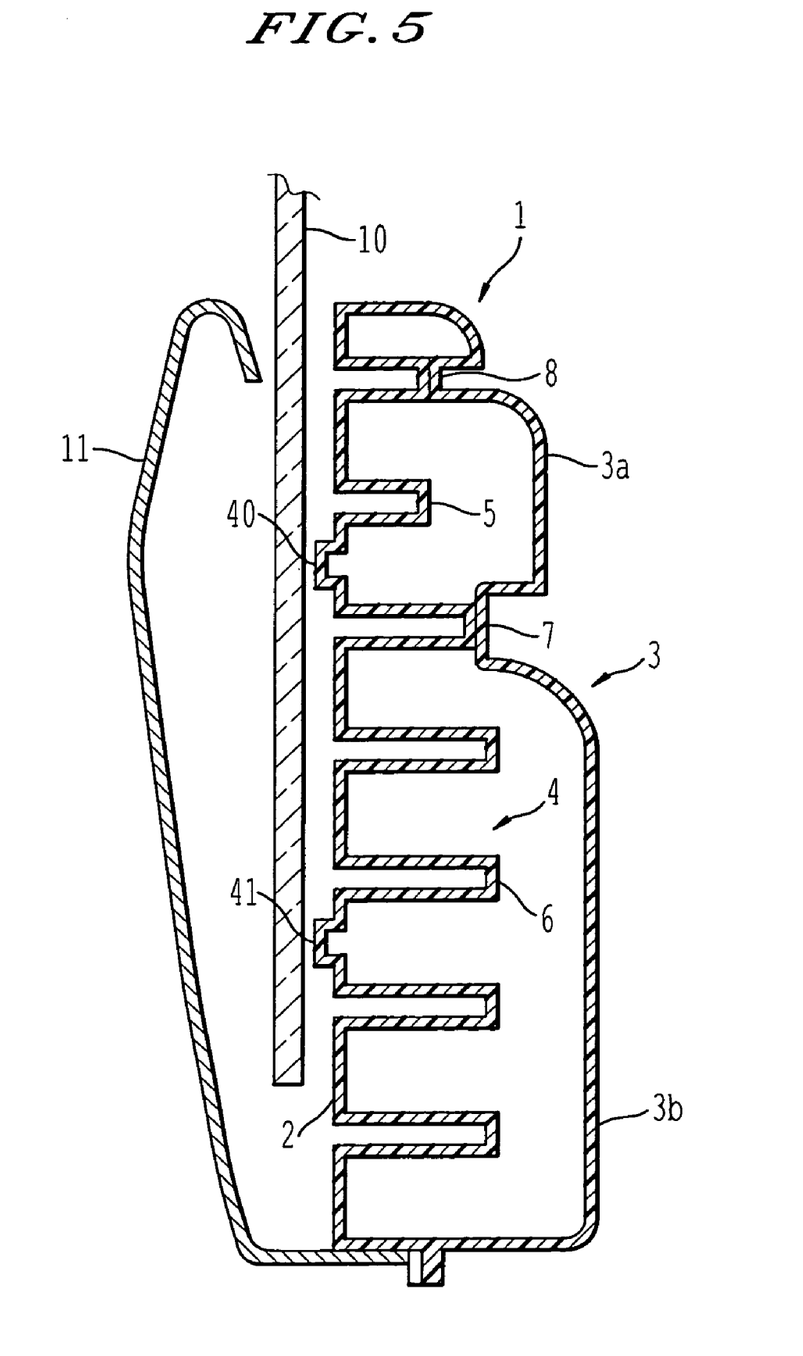
FIG. 5 is a conceptual cross-sectional view of an automobile door according to an alternative embodiment of the present invention.

The inner wall (this corresponds to the inner door panel) of the door trim structure 1 of the invention may be formed to have recesses and optionally protrusions (e.g., upper protrusion 40 and lower protrusion 41 depicted in FIG. 5) on its surface, and a door windowpane-sliding mechanism and any other mechanisms (these are fitted to the metallic inner door panel in conventional automobile door systems) are readily fitted to such recesses or protrusions of the structure 1. If desired, metallic fitting tools may be attached to the structure 1 in a mode of insertion molding.

In the door trim structure 1 of the present invention, in general, a plurality of recesses each having a desired depth may be formed on the inner wall, and the recesses thus formed act as shock absorbers. For shock absorption, the recesses constitute the upper shock absorprtion site 5 in the upper area of the door trim 3a, and the lower shock absorption site 6 in the lower area of the door trim 3b. Depending on the necessary characteristics for shock absorption, the recesses may be planned in any desired manner. Their size, shape, distribution, depths, and depth disbribution shall be suitabley determined, with the wall thickness being taken into consideration. One example of the shape and the distrubution of the recesses and also the inner sealing sites of both walls is shown in FIG. 2.

The thermoplastic resin to be used in the invention is not specifically defined, including, for example, polyolefin resins such as polypropylenes, propylene-ethylene block copolymers, propylene-ethylene random copolymers, low-crystalline polypropylene resins, high-density polyethylenes, ethylene-α-olefin copolymers, etc.; styrene resins such as polystyrenes, rubber-modified impact-resistant polystyrenes, syndiotactic-structured polystyrenes, ABS resins, AS resins, etc.; as well as acrylic resins, polyvinyl chloride resins, polyamide resins, polyester resins, polyphenylene sulfide resins, polyurethane resins, polyacetal resins, polycarbonate resins, polyaromatic ether or thioether resins, polyaromatic ester resins, polysulfone resins, polyarylate resins, thermoplastic elastomers, etc. One or more of these thermoplastic resins may be used herein either singly or as combined.

Of these thermoplastic resins, preferred are polypropylene resins, high-density polyethylene resins, polyamide resins, polyester resins, polycarbonate resins, ABS resins, as well as thermoplastic resins essentially comprising any of such resins.

In case where polypropylene resin is used in the invention, it is preferably a homopolypropylene resin, or a block copolymer of propylene with any other olefin, or a random copolymer of propylene with at most a few % by weight of any other olefin. The additional olefin is for improving the impact resistance of the propylene copolymers. The polypropylene resin for use herein may have a melt index (MI, measured at 230° C. under a load of 2.16 kg according to JIS K7210) falling between 0.1 and 50 g/10 min, preferably between 0.2 and 10 g/10 min. For further improving the impact resistance of the resin, thermoplastic resin elastomer or amorphous or low-crystalline polypropylene resin may be added to the resin.

The thermoplastic elastomer may be an olefinic elastomer, including, for example, ethylene-propylene copolymer elastomers (EPR), ethylene-butene-1 copolymer elastomers, ethylene-octene-1 copolymer elastomers, ethylene-propylene-butene-1 copolymer elastomers, ethylene-propylene-diene copolymer elastomers (EPDM), ethylene-propylene-ethylidenenorbornene copolymer elastomers, soft polypropylenes, soft polypropylene copolymers, etc. Of these, in general, the ethylenic elastomers may have an ethylene content of from 40 to 90% by weight or so. These elastomers may have a Mooney viscosity ($ML_{1+4}$ 100) of generally between 5 and 100, but preferably between 10 and 60.

Also usable are styrenic elastomers, and their examples are styrene-butadiene copolymer elastomers, styrene-isoprene copolymer elastomers, styrene-butadiene-isoprene copolymer elastomers, and also their completely or partially hydrogenated copolymer elastomers such as styrene-ethylene-butylene-styrene copolymer elastomers (SEBS), styrene-ethylene-propylene-styrene copolymers (SEPS), etc. These elastomers may have a melt index (MI, measured at 200° C. under a load of 5 kg according to JIS K7210) falling between 0.1 and 120 g/10 min, preferably between 8 and 100 g/10 min.

For large-size door trim structures, a high melt-tension resin or a resin mixture comprising the resin may be used for improving the drawdown resistance of the parison extruded. For example, a high-density polyethylene or elastomer may be added to polypropylene resins. The high-density polyethylene resin may have a density falling between 0.940 and 0.975 g/cm$^3$, preferably between 0.945 and 0.970 g/cm$^3$, and a melt index (measured at 190° C. under a load of 2.16 kg/10 min according to JIS K7210) falling 0.01 and 20 g/10 min, preferably between 0.02 and 10 g/10 min.

To the starting thermoplastic resin to form the door trim structure for automobiles of the invention, various additives such as antioxidants, heat stabilizers, weather-proofing agents, light stabilizers and others may be added. One or more different types of these additives may be added thereto either singly or as combined. The antioxidants are not specifically defined and may be any conventional ones, including, for example, phenolic antioxidants, phosphorus-containing antioxidants, sulfur-containing antioxidants, etc.

In addition to such additives, any of glass fibers, carbon fibers, metal powder, carbon black, graphite, talc, titanium oxide, zinc oxide, dispersants, antistatic agents, flame retardants, flame retardant promoters, plasticizers, nucleating agents, peroxides, epoxy compounds, metal inactivators, pigments, dyes and others may be added to the starting resin, if desired. In case where the reinforcing agent and the filler such as glass fibers, talc and others are added to the thermoplastic resin, it is desirable that the resin contains modified resins such as those modified with any of unsaturated carboxylic acids and their derivatives such as maleic anhydride, fumaric acid, methacrylic acid, etc. The resins to be modified include thermoplastic resins such as those mentioned above, and various elastomers. For modifying them, generally employed is graft modification, but also employable is copolymerization. Examples of the resins to be modified are polyolefin resins such as polypropylene resins, polyethylene resins, etc.; as well as polyolefin elastomers, polystyrene resins, etc. The content of the unsaturated carboxylic acid or its derivative to be in the modified resins may fall generally between 0.01 and 10% by weight; and the modified resin content of the resin mixture for use herein may fall between 0.5 and 20% by weight or so.

Figure 4:
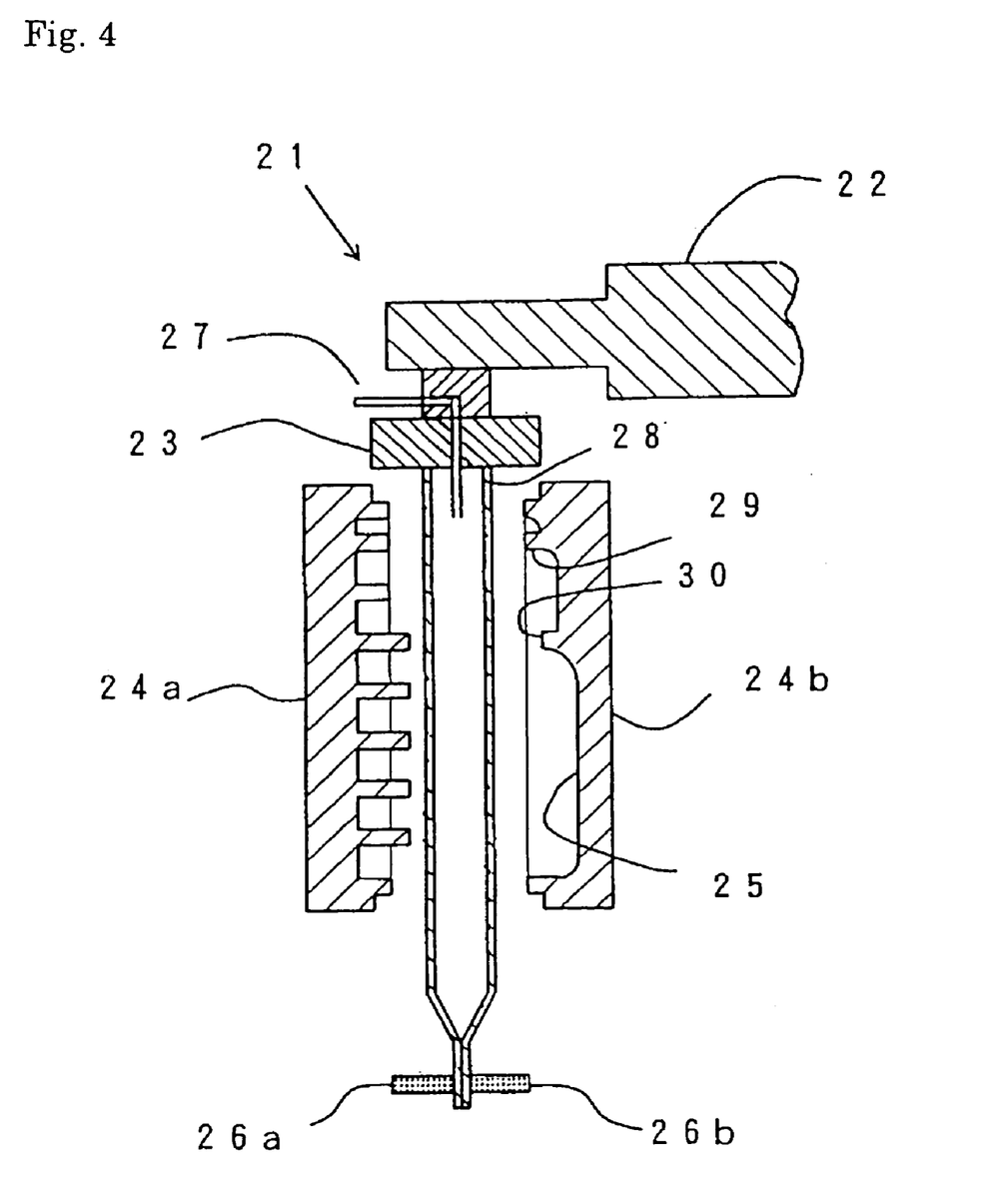
FIG. 4 shows a blow-molding device, in which the mold is not as yet clamped.

The blow-molding method for producing the door trim structure of the invention is described hereinunder with reference to the drawings attached hereto. FIG. 4 shows a blow-molding device, in which the mold is not as yet clamped. In FIG. 4, 21 indicates a blow-molding device; 22 indicates an extruder; 23 indicates an extrusion die; 24 indicates a mold; 25 indicates the inner surface of the mold; 26 indicates a parison pinchcock; 27 indicates a blowpipe; 28 indicates a parison; 29 indicates a protrusion for the door knob-fitting site of the molding; and 30 indicates a protrusion for the door grip-fitting site of the molding.

For the blow-molding method, used is the blow-molding device 21. A thermoplastic resin such as a polypropylene resin or the like is melt-kneaded in the extruder 22, and extruded out through the extrusion die 23 to give a parison 28. Having been thus extruded out, the parison is pinched with the parison pinchcock 26*a*, 26*b,* while being held by the facing mold splits 24*a*, 24*b*. With that, this is blown with gas such as air or the like led thereinto via the blowpipe 27. Thus blown, the parison is pressed against the inner wall 25 of the mold and shaped. Next, the inner surface of the mold is cooled with the thus-shaped resin layer being in contact therewith, and thereafter the mold is opened, and the shaped article, door trim structure is taken out of the mold.

The inner surface of the mold is so designed that one mold split 24*a* is to form the inner surface of the door trim structure and the other mold split 24*b* is to form the outer surface thereof which is to face the inside of an automobile, as in FIG. 4. The trim-forming surface of the mold split 24*b* is composed of two parts, upper and lower parts. At around the top of the upper part, this has a protrusion 29 for forming the door knob-fitting site of the door trim. When the mold is clamped, the protrusion 29 of the mold split 24*b* meets the protrusion of the other mold split 24*a* so that the facing inner surfaces of the blown structure are fused to form a seal. Similarly, the facing inner surfaces thereof are fused also to form a seal at the protrusion 30 which is for forming the door grip-fitting site of the blown structure.

The sealing site may be disposed in any other area in any desired manner. After fused, the seals ensure the mechanical strength, the rigidity and the twisting resistance of the door trim structure, and contribute to improving the dimensional accuracy of the inner wall of the structure.

In addition, the inner surface of the mold split 24*a* is designed to have other protrusions that are to form a plurality of long oval recesses on the inner wall of the door trim structure, as in FIGS. 1 and 2. The shape and the depth of these plural protrusions may be determined in any desired manner, and the distribution thereof may also be determined in any desired manner. If desired, a plurality of such protrusions each having a different shape, a different size and a different depth may be combined in any desired manner.

In the blow-molding method, the timing of pinching the bottom of the parison, that of starting to clamp the mold, that of holding the parison in the mold, and that of blowing the parison (including pre-blowing it) may be suitably controlled, depending on the size and the shape of the door trim structure to be finished and on the melt characteristics of the thermoplastic resin used. In addition, the parison is blown both in its circumferential direction and in its extrusion direction in such a controlled manner that the wall thickness of the thus-blown parison is enough for the function of the intended door trim structure for automobiles.

In the embodiment described above, the parison is formed through continuous extrusion of the starting resin. Apart from this, however, a melt of the starting resin may be once accumulated in an accumulator disposed before the extruder, and it may be extruded out of the accumulator all at a time via a plunger to give a parison in the mold. In FIG. 4, the machine direction of the door trim structure to be formed is the same as that of the flow direction of the parison. In a manner different from this, however, the flow direction of the parison may be to correspond to the lateral direction of the door trim structure to be formed.

In blow-molding it, the shape of the melt parison is not limited to only the circular parison as illustrated. If desired, a sheet-like parison may be extruded out to be held in the mold, and it maybe blown. In the mode of sheet extrusion blow-molding, two sheets of two different thermoplastic resins may be extruded out through two extruders. If so, the door trim and the inner door panel of the door trim structure may be made of the individual two different resins. In this case, a reinforcing material of, for example, glass fibers or carbon fibers may be added generally to the resin which is to form the inner wall of the structure, to thereby enhance the mechanical strength and the rigidity of the inner wall of the structure. The resin which is to form the door trim of the structure may be a soft resin. In that manner, the latitude in planning the door trim structure can be broadened.

The blow-molding method may be for single-layered parisons and may also be for multi-layered parisons having any other resin layer on the outer surface or on both the outer and inner surfaces of each parison. The door trim structure of the invention is generally formed in the single-layer blow-molding method, but may also be formed in the multi-layer blow-molding method. In the latter case, the thermoplastic resin for the inner layer is selected on the basis of the basic physical properties including the mechanical strength, the rigidity and impact resistance of the door trim structure to be formed. For the outer layer, used is a resin or resin composition enough to ensure good appearance including smoothness and gloss of the structure and to ensure good scratch resistance and softness thereof.

If desired, the area corresponding to the door trim of the structure may be partly coated with a skin member of, for example, soft resin, thermoplastic elastomer, artificial leather, woven fabric or non-fabric. The skin member may be disposed in the necessary region of the inner surface of the mold that corresponds to the intended area of the door trim, and may be integrated with the door trim while the parison is blown.

The advantages of the invention are described concretely with reference to the following Example, which, however, is not intended to restrict the scope of the invention.

EXAMPLE

70% by weight of polypropylene resin pellets having a melt index (MI, measured at 230° C. under a load of 2.16 kg according to JIS K7210), 10% by weight of high-density polyethylene pellets having MI (at 190° C. under a load of 2.16 kg) of 0.02 g/10 min, and 20% by weight of talc (Asada Milling's FFR) were melt-kneaded. To 100 parts by weight of pellets of the resulting resin composition, added were 0.2 parts by weight of an antioxidant, Ciba Speciality Chemicals' Irganox 1076 and 0.2 parts by weight of an antioxidant, Ciba Speciality Chemicals' Irgafos 168 to prepare a molding material.

The molding apparatus used herein is equipped with a blow-molding machine, Ishikawajima Harima Heavy Industries' EPML-90B with a mold for automobile door trim structures as in FIG. 1.

The molding material was melted and kneaded at 220° C., and extrude out to form a parison, and the parison was held in the mold, and blown and shaped with air of 5 kg/cm$^2$ introduced thereinto. Then, the mold was well cooled, and opened to take out the shaped article from it. The thickness of the essential part of the wall of shaped article was about 3 mm.

INDUSTRIAL APPLICABILITY

The door trim structure for automobiles of the invention is made of an integrally blow-molded thermoplastic resin. Therefore, as compared with conventional door trim structures composed of an inner door panel of metal and a door trim of thermoplastic resin, it is lightweight and simple and its production saves energy and labor. In addition, functional members for automobile doors and shock absorbers may be formed all at a time in the structure. Accordingly, the door system with the structure of the invention significantly improves automobile productivity. Further, the door trim structure of the invention makes it possible to provide any type of door systems corresponding to any desired type and use of automobiles, when the extrusion die to give parisons and the mold to blow the parisons are suitably designed and when the condition for driving the blow-molding device is suitably determined. Moreover, since the door trim structure of the invention is made of only thermoplastic resin, its wastes can be recycled. Being lightweight and recyclable, it contributes to saving resources.

The invention claimed is:

1. A method of making a door trim structure for automobiles, the door trim structure including a door trim and an inner door panel, the inner door panel is a shock absorber, the inner door panel includes a functional member attachment portion integral with the inner door panel, wherein the functional member attachment portion includes a recess or a protrusion as a part of an inner wall of the door trim structure, said method comprising the step of:

forming the inner door panel and the door trim of thermoplastic resin into an integral one-piece unit by a blow-molding process, wherein the inner door panel and the door trim are formed from a single parison with a tip end of the inner door panel being bonded and integrated with the door trim at at least one part, wherein the functional member attachment portion is formed to include a first protrusion, and wherein the door trim is formed to include a second protrusion that is fused to the first protrusion to form a seal.

2. The method as claimed in claim 1, wherein the inner door panel is formed with a plurality of recesses.

3. The method as claimed in claim 1, wherein the thermoplastic resin is selected from polypropylene resins, polyamide resins, polycarbonate resins, polyester resins, and ABS resins.

4. The method as claimed in claim 1, wherein the thermoplastic resin is a polypropylene resin having a melt index (MI) of from 0.1 to 10 g/10 mm.

* * * * *